United States Patent
Tang et al.

(10) Patent No.: US 11,955,657 B2
(45) Date of Patent: Apr. 9, 2024

(54) BATTERY, POWERED DEVICE, METHOD FOR PREPARING BATTERY, AND DEVICE FOR PREPARING BATTERY

(71) Applicant: Contemporary Amperex Technology Co., Limited, Ningde (CN)

(72) Inventors: Yu Tang, Ningde (CN); Haiqi Yang, Ningde (CN); Zhimin Zeng, Ningde (CN); Peng Wang, Ningde (CN); Xiaoteng Huang, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 40 days.

(21) Appl. No.: 17/935,130

(22) Filed: Sep. 25, 2022

(65) Prior Publication Data

US 2023/0030782 A1 Feb. 2, 2023

Related U.S. Application Data (63) Continuation of application No. PCT/CN2021/109403, filed on Jul. 29, 2021.

(51) Int. Cl.
*H01M 50/367* (2021.01)
*H01M 50/289* (2021.01)
*H01M 50/342* (2021.01)

(52) U.S. Cl.
CPC ..... *H01M 50/3425* (2021.01); *H01M 50/289* (2021.01); *H01M 2220/20* (2013.01)

(58) Field of Classification Search
CPC .......... H01M 50/3425; H01M 50/289; H01M 2220/20
See application file for complete search history.

(56) References Cited

FOREIGN PATENT DOCUMENTS

| | | |
|---|---|---|
| CN | 104425781 A | 3/2015 |
| CN | 112331992 A | 2/2021 |
| JP | 2010108823 A | 5/2010 |
| JP | 2018077932 A | 5/2018 |
| JP | 2021057145 A | 4/2021 |
| JP | 2021536099 A | 12/2021 |
| JP | 2022522369 A | 4/2022 |

(Continued)

OTHER PUBLICATIONS

International Search Report received in PCT Application PCT/CN2021/109403 dated Nov. 10, 2021.

(Continued)

*Primary Examiner* — James Lee
(74) *Attorney, Agent, or Firm* — Kilpatrick Townsend & Stockton LLP

(57) ABSTRACT

A battery, a powered device, and a method and device for preparing a battery are provided. In some embodiments, the battery includes: a first battery cell and a second battery cell, wherein a pressure relief mechanism of the first battery cell and a pressure relief mechanism of the second battery cell are arranged opposite to 5 each other in a first direction; a box body accommodating the first battery cell and the second battery cell; and a partition component configured to partition the first battery cell and the second battery cell in the first direction, wherein the partition component includes a first wall and a second wall arranged opposite to each other, the first wall is provided with a first through hole, the second wall is provided with a second through hole.

19 Claims, 7 Drawing Sheets

(56) References Cited

FOREIGN PATENT DOCUMENTS

| KR | 20150024724 A | 3/2015 |
|---|---|---|
| WO | 2020134070 A1 | 7/2020 |

OTHER PUBLICATIONS

Written Opinion received in PCT Application PCT/CN2021/073158 dated Sep. 27, 2021.
Decision to Grant a Patent received in the corresponding Japanese Application 2022-552680, dated Oct. 3, 2023.
The Written Decision on Registration received in the corresponding Korean Application 10-2022-7030828, dated Feb. 13, 2024.

BATTERY, POWERED DEVICE, METHOD FOR PREPARING BATTERY, AND DEVICE FOR PREPARING BATTERY

CROSS-REFERENCE TO RELATED APPLICATIONS

This application is a continuation of International Application PCT/CN2021/109403, filed on Jul. 29, 2021, and entitled "BATTERY, POWERED DEVICE, METHOD FOR PREPARING BATTERY, AND DEVICE FOR PREPARING BATTERY", which is incorporated herein by reference in its entirety.

TECHNICAL FIELD

The present disclosure relates to the field of energy storage devices, and more particularly, to a battery, a powered device, a method for preparing a battery, and a device for preparing a battery.

BACKGROUND ART

Energy saving and emission reduction is the key to sustainable development of the automobile industry. In this case, electric vehicles have become an important part of the sustainable development of the automobile industry because of their advantages of energy saving and environmental protection. For electric vehicles, the battery technology is an important factor that is vital to its development.

With the continuous development of the battery technology, higher requirements are placed on the performance of the battery, and it is expected that the battery can consider various design factors at the same time.

SUMMARY

The present disclosure provides a battery, a powered device, a method for preparing a battery, and a device for preparing a battery, so as to improve the safety of the battery.

In a first aspect, a battery is provided, including: a first battery cell and a second battery cell, wherein a pressure relief mechanism of the first battery cell and a pressure relief mechanism of the second battery cell are arranged opposite to each other in a first direction; a box body accommodating the first battery cell and the second battery cell; and a partition component configured to partition the first battery cell and the second battery cell in the first direction, wherein the partition component includes a first wall and a second wall arranged opposite to each other, the first wall is provided with a first through hole, the second wall is provided with a second through hole, the first through hole is configured to guide emissions discharged from the pressure relief mechanism of the first battery cell, the second through hole is configured to guide emissions discharged from the pressure relief mechanism of the second battery cell, a first guard member is attached to the first wall, the first guard member has a first weak portion arranged opposite to the first through hole, a second guard member is attached to the second wall, and the second guard member has a second weak portion arranged opposite to the second through hole, wherein in a cross section perpendicular to the first direction, the area of the first weak portion is greater than that of the first through hole, and the area of the second weak portion is greater than that of the second through hole.

In a battery, when a battery cell is thermally runaway, damaged, or the like, high-temperature and high-pressure emissions are discharged from the pressure relief mechanism of the battery cell. When the pressure relief mechanism is located between two adjacent battery cells, heat generated by the thermally runaway battery cell will be further conducted to another battery cell located opposite to it, resulting in thermal runaway diffusion, which causes serious thermal runaway, or even causes an accident such as fire and explosion.

In the technical solution of the present disclosure, the partition component is provided between the first battery cell and the second battery cell in the first direction in which the pressure relief mechanisms of the first battery cell and the second battery cell are arranged opposite to each other, and therefore, the partition component can be used to achieve thermal insulation and fire protection during thermal runaway of a battery cell. Furthermore, the emissions ejected from the adjacent pressure relief mechanisms are guided to the interior of the partition component by the first through hole and the second through hole, and therefore, the discharge of the emissions can be easily guided. Furthermore, by adopting the structures of the first guard member and the second guard member described above, the emissions entering the partition component from the first through hole can be prevented from reaching the second battery cell through the second through hole, and the emissions reaching the partition component from the second through hole can be prevented from reaching the first battery cell through the first through hole. Therefore, the problem of thermal runaway diffusion described above will not occur.

In some examples, the first guard member is arranged to closely attach to the first wall, and the second guard member is arranged to closely attach to the second wall. Therefore, for example, when the emissions entering the partition component from the first through hole impact the second guard member, the second guard member can be supported by the closely attached second wall, and the structural rigidity of the second guard member is further guaranteed, so that the emissions entering from the first through hole will not pierce through the second guard member to reach the second battery cell. It is the same for the first guard member.

In some examples, the first weak portion is arranged by forming a score in the first guard member or by configuring the thickness of the first weak portion to be thinner than other portions of the first guard member, and the second weak portion is arranged by forming a score in the second guard member or by configuring the thickness of the second weak portion to be thinner than other portions of the second guard member. By forming the first weak portion in this way, the emissions ejected from the pressure relief mechanism of the first battery cell can impact the first weak portion through the first through hole smaller in area than the first weak portion to open it, so as to enter the partition component. However, since the area of the second weak portion is greater than that of the second through hole, the emissions entering from the first through hole will not pierce the second weak portion, thereby preventing the emissions entering from the first through hole from affecting the second battery cell, and preventing the spread of thermal runaway. The second weak portion also has the same function.

In some examples, in the first direction, a projection of the first weak portion covers a projection of the first through hole, and a projection of the second weak portion covers a projection of the second through hole. Therefore, it can be further guaranteed that the first weak portion and the second weak portion will not be partially damaged.

In some examples, the box body has an upper cover and a box shell that are connected in a second direction, and the first battery cell and the first battery cell are accommodated in a space surrounded by the upper cover and the box shell. The second direction is orthogonal to the first direction, and the partition component is hermetically connected to the upper cover and the box shell. In some examples, the first wall, the second wall, the upper cover, and the box shell surround together to form an exhaust passage for the emissions to flow. In order to cause the emissions entering into the space in the partition component from the first through hole and the second through hole to flow along the exhaust passage and no longer leak to the outside of the partition component, the partition component is sealed with both the upper cover and the box shell. The sealing may be achieved, for example, by applying a sealant, providing a seal liner, or the like.

In some examples, an exhaust member is formed at a position of the box body opposite to an outlet of the exhaust passage, and the exhaust member is configured to discharge the emissions flowing in the exhaust passage to the outside of the box body. The exhaust passage formed by surrounding the first wall, the second wall, the upper cover, and the box shell together has an outlet in an extending direction thereof, and the exhaust member is arranged at the position of the box body opposite to the outlet. Therefore, the emissions that reach the outlet via the exhaust passage can be efficiently discharged to the outside of the box body.

In some examples, the partition component further includes a connecting component, and the connecting component is configured to connect the first wall and the second wall. Therefore, the rigidity of the whole partition component can be strengthened. The partition component can also be integrally formed.

In some examples, the box body has an upper cover and a box shell connected in a second direction, and the second direction is orthogonal to the first direction. Both the top and the bottom of the partition component in the second direction are formed with the connecting components, the connecting component at the top is in seal connection with the upper cover, and the connecting component at the bottom is in seal connection with the box shell. That is, the partition component is formed in a square shape, and the area of the seal connection is increased compared with the partition component where the connecting component at the top and the connecting component at the bottom are not formed, which can not only enhance the rigidity of the entire partition component, but also enhance the sealing performance.

In some examples, the partition component further includes a first support member configured to support the first guard member, and a second support member configured to support the second guard member. In some examples, the first support member is connected to the first wall, and the second support member is connected to the second wall. Therefore, in a case that the partition component has only the first wall and the second wall and does not have the connecting components, the first guard member and the second guard member can be stably supported by using the first support member and the second support member of the partition component. The structural stability of the first guard member and the second guard member is guaranteed.

In some examples, the partition component further includes a first support member configured to support the first guard member, and a second support member configured to support the second guard member. The first support member is connected to the first wall and/or the connecting components, and the second support member is connected to the second wall and/or the connecting components. Therefore, in a case that the partition component has the first wall, the second wall, and the connecting components, the first guard member and the second guard member can be stably supported by the first support member and the second support member arranged on the partition component and/or the connecting component. The structural stability of the first guard member and the second guard member is guaranteed.

In some examples, a slot for the first guard member to slide is formed between the first wall and the first support member, for positioning the first guard member, and a slot for the second guard member to slide is formed between the second wall and the second support member, for positioning the second guard member. Therefore, during installation, the first guard member and the second guard member can be slid along the slots to appropriate installation positions, thereby improving the positioning accuracy. Further, when the partition component is long in the extending direction, the first guard member and the second guard member can be well placed into suitable installation positions.

In some examples, the first guard member and the second guard member are connected via a guard connector. Therefore, the rigidity of the first guard member and the second guard member can be improved. In some examples, the first guard member, the guard connector, and the second guard member are integrally formed. Therefore, processing can be facilitated and productivity can be improved.

In a second aspect, a powered device is provided, including the battery in the first aspect. The battery is configured to provide electrical energy.

In a third aspect, a method for preparing a battery is provided, including: providing a first battery cell and a second battery cell, wherein a pressure relief mechanism of the first battery cell and a pressure relief mechanism of the second battery cell are arranged opposite to each other in a first direction; providing a box body, wherein the box body accommodates the first battery cell and the second battery cell; providing a partition component, wherein the partition component is configured to partition the first battery cell and the second battery cell in the first direction, the partition component includes a first wall and a second wall arranged opposite to each other, the first wall is provided with a first through hole, the second wall is provided with a second through hole, the first through hole is configured to guide emissions discharged from the pressure relief mechanism of the first battery cell, and the second through hole is configured to guide emissions discharged from the pressure relief mechanism of the second battery cell; providing a first guard member, wherein the first guard member is attached to the first wall, and the first guard member has a first weak portion arranged opposite to the first through hole; and providing a second guard member, wherein the second guard member is attached to the second wall, and the second guard member has a second weak portion arranged opposite to the second through hole, wherein in a cross section perpendicular to the first direction, the area of the first weak portion is greater than that of the first through hole, and the area of the second weak portion is greater than that of the second through hole.

In a fourth aspect, a device for preparing a battery is provided, including: a first providing module configured to provide a first battery cell and a second battery cell, wherein a pressure relief mechanism of the first battery cell and a pressure relief mechanism of the second battery cell are arranged opposite to each other in a first direction; a second providing module configured to provide a box body, wherein the box body accommodates the first battery cell and the second battery cell; a third providing module configured to provide a partition component, wherein the partition component is configured to partition the first battery cell and the second battery cell in the first direction, the partition component includes a first wall and a second wall arranged opposite to each other, the first wall is provided with a first through hole, the second wall is provided with a second through hole, the first through hole is configured to guide emissions discharged from the pressure relief mechanism of the first battery cell, and the second through hole is configured to guide emissions discharged from the pressure relief mechanism of the second battery cell; a fourth providing module configured to provide a first guard member, wherein the first guard member has a first weak portion; a fifth providing module configured to provide a second guard member, wherein the second guard member has a second weak portion; and an installing module configured to attach the first guard member to the first wall so that the first weak portion of the first guard member is arranged opposite to the first through hole, attach the second guard member to the second wall so that the second weak portion of the second guard member is arranged opposite to the second through hole, and install the partition component and the battery cells on the box body, wherein in a cross section perpendicular to the first direction, the area of the first weak portion is greater than that of the first through hole, and the area of the second weak portion is greater than that of the second through hole.

DESCRIPTION OF DRAWINGS

The accompanying drawings described herein are used for providing further understanding of the present disclosure and constitute a part of the present disclosure. The schematic examples and descriptions of the present disclosure are used for explaining the present disclosure and do not constitute an improper limitation to the present disclosure. In the accompanying drawings.

DETAILED DESCRIPTION

In order to make the purposes, technical solutions, and advantages of the examples of the present disclosure clearer, the technical solutions in the examples of the present disclosure will be clearly described below with reference to the accompanying drawings in the examples of the present disclosure. It is obvious that the described examples are some examples, rather than all examples of the present disclosure. Based on the examples in the present disclosure, all other examples obtained by those of ordinary skill in the art without creative efforts fall within the protection scope of the present disclosure.

Unless otherwise defined, all technical and scientific terms used in the present disclosure have the same meaning as commonly understood by those skilled in the art to which the present disclosure belongs; the terms used in the specification of the disclosure in the present disclosure are for the purpose of describing specific examples only, and are not intended to limit the present disclosure; the terms "including" and "having" and any variations thereof in the description and claims of the present disclosure as well as in the above description of drawings are intended to cover a non-exclusive inclusion. The terms "first," "second," and the like in the description and claims of the present disclosure or the above accompanying drawings are used for distinguishing different objects, rather than describing a specific order or primary and secondary relationship.

Reference to "an example" in the present disclosure means that a particular feature, structure, or characteristic described in connection with the example can be included in at least one example of the present disclosure. The appearance of this phrase in various places in the specification does not necessarily refer to the same example, nor is it a separate or alternative example that is mutually exclusive with other examples. It is understood explicitly and implicitly by those skilled in the art that the examples described in the present disclosure can be combined with other examples.

In the description of the present disclosure, unless otherwise expressly specified and limited, terms "installation," "connected," "connect," and "attach" should be broadly understood, for example, they may be a fixed connection or a detachable connection or an integrated connection; or may be a direct connection or an indirect connection through an intermediate medium, or may be a communication between the interior of two elements. For those of ordinary skill in the art, the specific meanings of the above terms in the present disclosure can be understood according to specific situations.

In the present disclosure, the term "and/or" is only an association relationship for describing associated objects, indicating that three relationships may exist. For example, A and/or B indicates that there are three cases of A alone, A and B together, and B alone. In addition, the character "I" in the present disclosure generally means that associated objects before and after it are in an "or" relationship.

In the present disclosure, the term "plurality of" refers to two or more (including two), and similarly, "plurality of groups" refers to two or more (including two) groups, and "plurality of sheets" refers to two or more (including two) sheets.

The battery mentioned in examples of the present disclosure refers to a single physical module including a plurality of battery cells to provide higher voltage and capacity. For example, the battery mentioned in the present disclosure may include a battery module, a battery pack, or the like.

The battery cell includes an electrode assembly and an electrolyte solution, and the electrode assembly includes a positive electrode sheet, a negative electrode sheet, and a separator. The battery cell works mainly relying on the movement of metal ions between the positive electrode sheet and the negative electrode sheet. The positive electrode sheet includes a positive current collector and a positive active material layer, the positive active material layer is coated on a surface of the positive current collector, the current collector not coated with the positive active material layer protrudes from the current collector coated with the positive active material layer, and the positive active material layer not coated with the current collector is used as a positive tab. Taking a lithium-ion battery as an example, the material of the positive current collector may be aluminum, and the positive active material may be lithium cobalt oxide, lithium iron phosphate, ternary lithium, lithium manganate, or the like. The negative electrode sheet includes a negative current collector and a negative active material layer, the negative active material layer is coated on a surface of the negative current collector, the current collector not coated with the negative active material layer protrudes from the current collector coated with the negative active material layer, and the current collector not coated with the negative active material layer is used as a negative tab. The material of the negative current collector may be copper, and the negative active material may be carbon or silicon. In order to ensure that a large current is passed without fusing, there are a plurality of positive tabs and they are stacked together, and there are a plurality of negative tabs and they are stacked together. The material of the isolating membrane may be PP, PE, or the like. In addition, the electrode assembly may be of a wound structure or a laminated structure, which is not limited in the example of the present disclosure.

The development of the battery technology needs to consider many design factors at the same time, such as energy density, cycle life, discharge capacity, charge-discharge rate, and other performance parameters. In addition, the safety of the battery also needs to be considered.

At present, a battery of an electric vehicle often requires dozens or even thousands of battery cells. In a battery, when a battery cell is thermally runaway, damaged, or the like, high-temperature and high-pressure emissions may be discharged from the pressure relief mechanism of the battery cell. When the pressure relief mechanism is located between two adjacent battery cells, heat generated by the thermally runaway battery cell will be further conducted to another battery cell located opposite to it, resulting in thermal runaway diffusion, which causes serious thermal runaway, or even causes an accident such as fire and explosion.

In view of the above, the present disclosure provides a technical solution, a battery, including: a first battery cell and a second battery cell, wherein a pressure relief mechanism of the first battery cell and a pressure relief mechanism of the second battery cell are arranged opposite to each other in a first direction; a box body accommodating the first battery cell and the second battery cell; and a partition component configured to partition the first battery cell and the second battery cell in the first direction, wherein the partition component includes a first wall and a second wall arranged opposite to each other, the first wall is provided with a first through hole, the second wall is provided with a second through hole, the first through hole is configured to guide emissions discharged from the pressure relief mechanism of the first battery cell, the second through hole is configured to guide emissions discharged from the pressure relief mechanism of the second battery cell, a first guard member is attached to the first wall, the first guard member has a first weak portion arranged opposite to the first through hole, a second guard member is attached to the second wall, and the second guard member has a second weak portion arranged opposite to the second through hole, wherein in a cross section perpendicular to the first direction, the area of the first weak portion is greater than that of the first through hole, and the area of the second weak portion is greater than that of the second through hole.

By arranging the partition component between the first battery cell and the second battery cell in the first direction in which the pressure relief mechanisms of the first battery cell and the second battery cell are arranged opposite to each other, the partition component can be used to achieve thermal insulation and fire protection during thermal runaway of a battery cell. Furthermore, the emissions ejected from the adjacent pressure relief mechanisms are guided to the interior of the partition component by the first through hole and the second through hole, and gas exhaust can also be achieved from the end of the partition component; therefore, the discharge of the emissions can be easily guided, thereby improving the overall safety of the battery. Furthermore, by adopting the structures of the first guard member and the second guard member described above, the emissions entering the partition component from the first through hole can be prevented from reaching the second battery cell through the second through hole, and the emissions reaching the partition component from the second through hole can be prevented from reaching the first battery cell through the first through hole. Therefore, the problem of thermal runaway diffusion will not occur.

A powered device is provided in an example of the present disclosure, and a battery is configured to provide electrical energy.

The technical solutions described in the examples of the present disclosure are all applicable to various devices using batteries, such as mobile phones, portable apparatuses, laptops, battery cars, electric toys, electric tools, electric vehicles, ships, spacecrafts, and the like. For example, the spacecrafts include airplanes, rockets, space shuttles, and spaceships.

It should be understood that the technical solutions described in the examples of the present disclosure are not only applicable to the devices described above, but also applicable to all apparatuses using batteries. However, for the sake of brevity, the following examples are described by taking an electric vehicle as an example.

Figure 1:
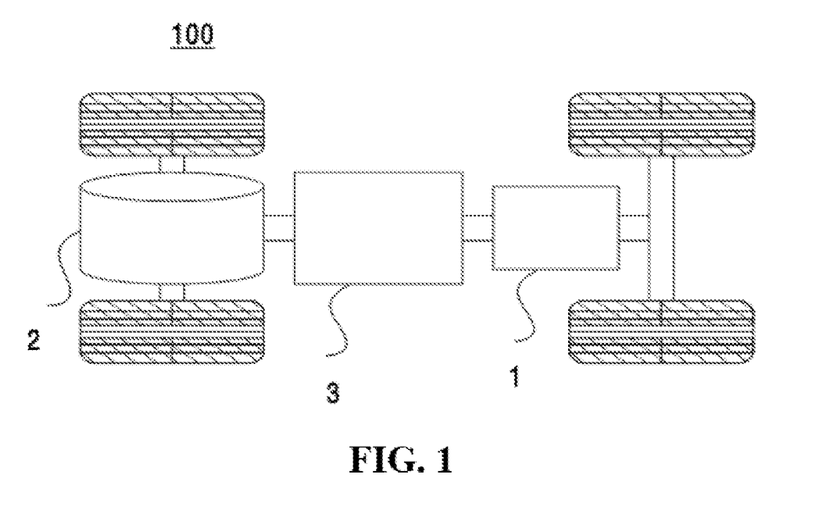
FIG. 1 is a schematic structural diagram of a vehicle according to an example of the present disclosure.

For example, as shown in FIG. 1, a schematic structural diagram of vehicle 100 according to an example of the disclosure is shown. Vehicle 100 may be a fuel vehicle, a gas vehicle, or a new energy vehicle, and the new energy vehicle may be an all-electric vehicle, a hybrid electric vehicle, an extended range electric vehicle, or the like. The interior of vehicle 100 may be provided with motor 2, controller 3, and battery 1, and controller 3 is configured to control battery 1 to supply power to motor 2. For example, battery 1 may be arranged at the bottom or the head or tail of vehicle 100. Battery 1 may be configured for power supply of vehicle 100. For example, battery 1 may be used as an operating power source of vehicle 100, and configured for work electricity requirements of a circuit system of vehicle 100, for example, for starting, navigation, and operation of vehicle 100. In another example of the present disclosure, battery 1 can not only be used as the operating power source of vehicle 100, but also can be used as a driving power source of vehicle 100 to provide driving power for vehicle 100 instead of or partially instead of fuel or natural gas.

In order to meet different power requirements, battery 1 may include a plurality of battery cells, wherein the plurality of battery cells may be in series connection, in parallel connection, or in parallel-series connection, and the parallel-series connection refers to mixing of the series connection and the parallel connection.

Figure 2:
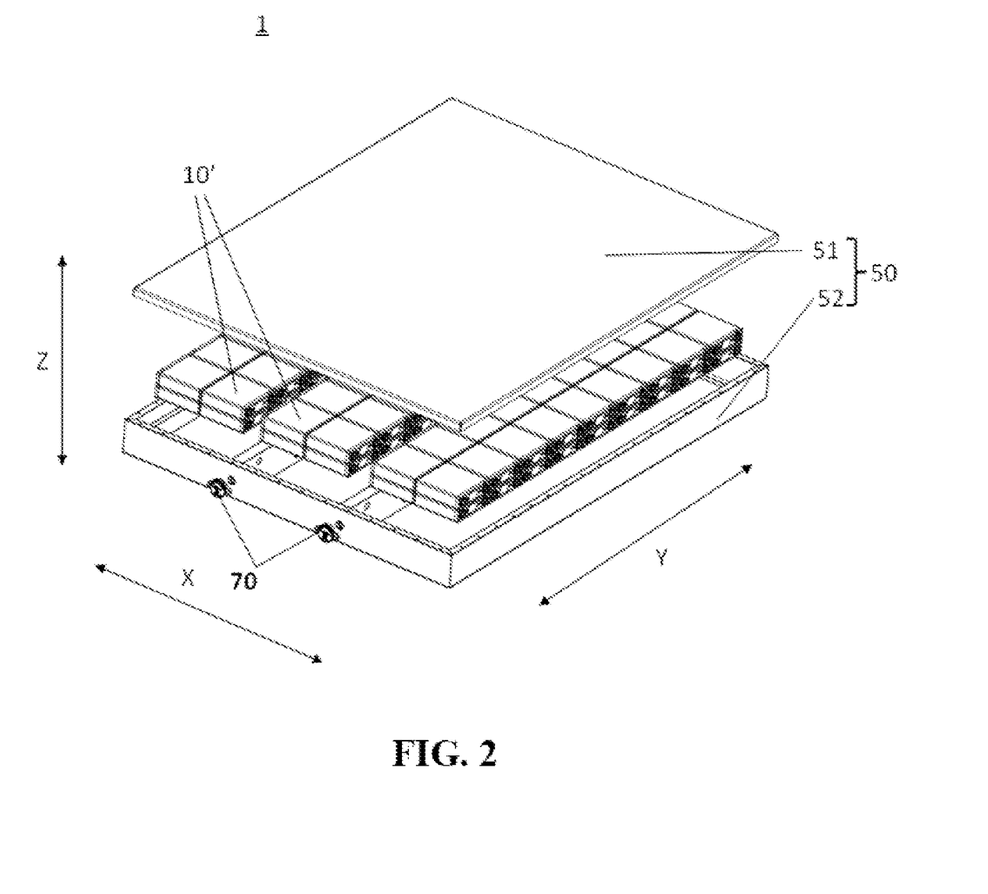
FIG. 2 is a schematic three-dimensional structural diagram of a battery according to an example of the present disclosure.

For example, as shown in FIG. 2, a schematic three-dimensional structural diagram of battery 1 according to an example of the present disclosure is shown. Battery 1 includes box body 50, the interior of box body 50 is a hollow structure, and battery cells 10' are accommodated in box body 50. As shown in FIG. 2, box body 50 may include two parts, which are referred to here as upper cover 51 and box shell 52 respectively. Upper cover 51 and box shell 52 are engaged together. The shape of upper cover 51 and box shell 52 may be determined according to the shape of a combination of the plurality of battery cells 10'. For example, upper cover 51 and box shell 52 may each be a hollow cuboid with only one surface being an open surface, the opening of upper cover 51 and the opening of box shell 52 are arranged opposite to each other, and upper cover 51 and box shell 52 are mutually engaged to form box body 50 with a closed chamber. It is also possible that upper cover 51 is a rectangular parallelepiped with an opening and box shell 52 is in a plate shape, or box shell 52 is a rectangular parallelepiped with an opening and upper cover 51 is in a plate shape. Upper cover 51 and box shell 52 are arranged opposite to each other and engaged to form box body 50 with a closed chamber. As shown in FIG. 2, a plurality of battery cells 10' are accommodated in box body 50, and the plurality of battery cells 10' can be arranged in first direction X and third direction Y, where first direction X is orthogonal to third direction Y. That is, the plurality of battery cells 10' in battery 1 may be arranged in a matrix-like structure. After the plurality of battery cells 10' are connected in parallel or in series or in a parallel-series combination, they are placed in box body 50 formed after upper cover 51 and box shell 22 are engaged together. Optionally, battery cells 10' of battery 1 may also be only two battery cells 10', and the pressure relief mechanisms of two battery cells 10' are arranged opposite to each other in first direction X.

Figure 3A:
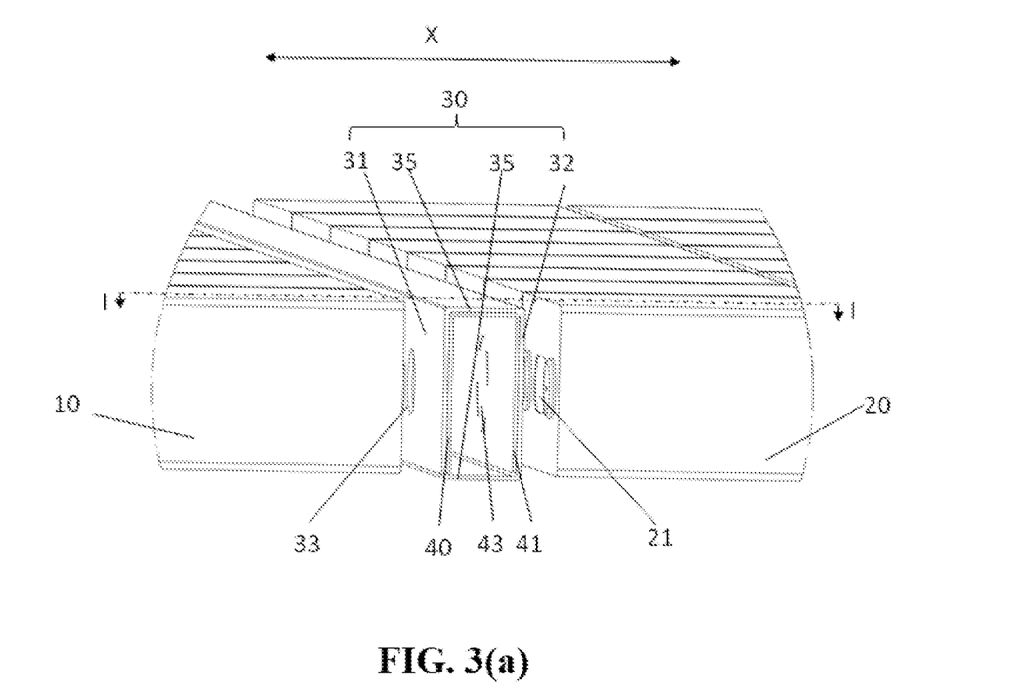
FIG. 3(a) is a schematic three-dimensional structural diagram of two battery cells and a partition component between the two battery cells.
Figure 3B:
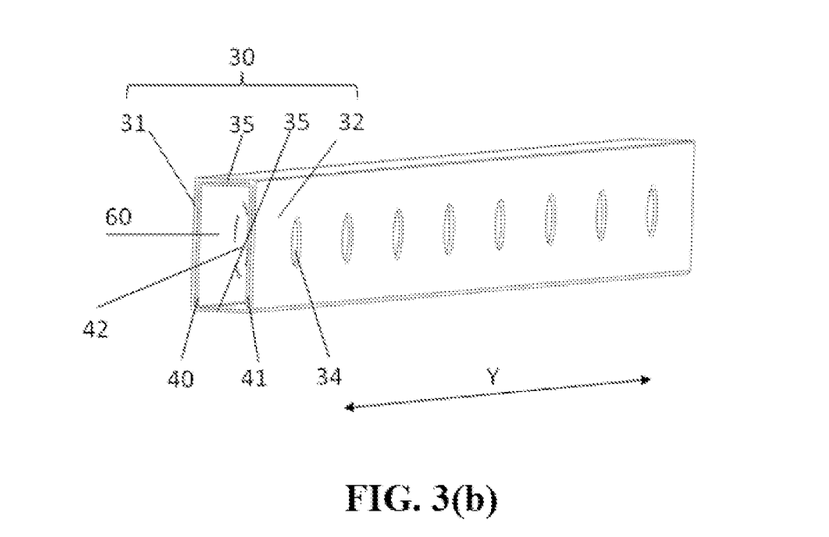
FIG. 3(b) is a schematic three-dimensional diagram of a structure of the partition component in FIG. 3(a) as observed from the side of a second wall.
Figure 4A:
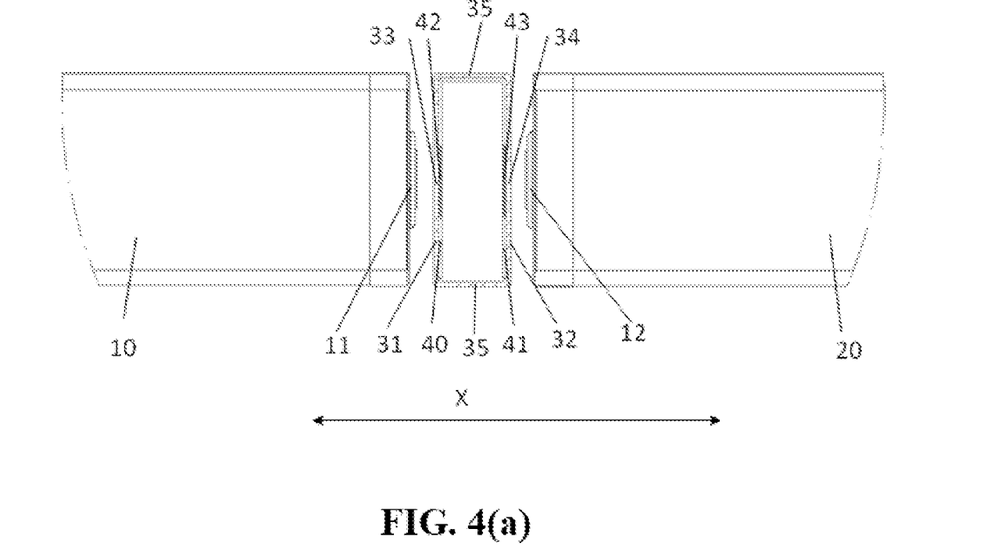
FIG. 4(a) is a cross-sectional diagram of I-I in FIG. 3(a)
Figure 4B:
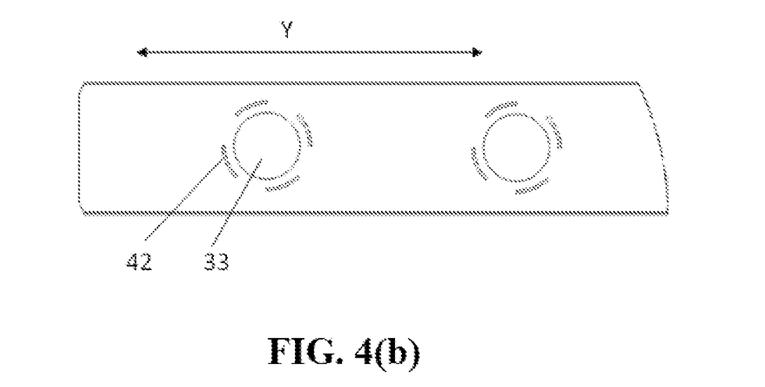
FIG. 4(b) is a schematic diagram showing a dimensional relationship of projections of a first through hole and a first weak portion in a first direction.

As shown in FIG. 3(a), a three-dimensional diagram of a structure in which the pressure relief mechanisms of two battery cells 10' are arranged opposite to each other in first direction X, and partition component 30 is arranged between two battery cells 10' is shown. As shown in FIG. 3(b), a schematic three-dimensional diagram of a structure of partition component 30 in FIG. 3(a) as observed from the side of second wall 32 is shown. FIG. 4(a) is a cross-sectional diagram of I-I in FIG. 3(a). FIG. 4(b) is a schematic diagram showing a dimensional relationship of projections of first through hole 33 and first weak portion 42 in first direction X.

As shown in FIG. 3(a) and FIG. 3(b), battery 1 has first battery cell 10 and second battery cell 20, and first pressure relief mechanism 11 of first battery cell 10 and second pressure relief mechanism 21 of second battery cell 20 are arranged opposite to each other in first direction X. partition component 30 is located between first battery cell 10 and second battery cell 20 in first direction X, and partitions first battery cell 10 from second battery cell 20 partition component 30 includes first wall 31 and second wall 32 arranged opposite to each other, first wall 31 is provided with first through hole 33, and second wall 32 is provided with second through hole 34. First through hole 33 is configured to guide emissions discharged from first pressure relief mechanism 11 to the space within partition component 30, and second through hole 34 is configured to guide emissions discharged from second pressure relief mechanism 21 to the space within partition component 30. First guard member 40 is attached to first wall 31, and first guard member 40 has first weak portion 42 arranged opposite to first through hole 33. Second guard member 41 is attached to second wall 32, and second guard member 41 has second weak portion 43 arranged opposite to second through hole 34. In a cross section perpendicular to first direction X, the area of first weak portion 42 is greater than that of first through hole 33, and the area of second weak portion 43 is greater than that of second through hole 34.

Therefore, by arranging partition component 30 between first battery cell 10 and second battery cell 20, partition component 30 can be used to achieve thermal insulation and fire protection during thermal runaway of first battery cell 10 or second battery cell 20. The emissions ejected from first pressure relief mechanism 11 or second pressure relief mechanism 21 are guided to the space in partition component 30 by first through hole 33 and second through hole 34, and therefore, the gas exhaust can be easily guided. Moreover, in the cross section perpendicular to first direction X, the area of first weak portion 42 is greater than that of first through hole 33, and the area of second weak portion 43 is greater than that of second through hole 34, so that the emissions entering partition component 30 from first through hole 33 will not reach second battery cell 20 through second through hole 34, and the emissions entering partition component 30 from second through hole 34 will not reach first battery cell 10 through first through hole 33, so that thermal runaway diffusion will not occur.

The pressure relief mechanism (such as first pressure relief mechanism 11 and second pressure relief mechanism 21) refers to an element or component that is actuated to relieve the internal pressure or temperature when the internal pressure or temperature of battery cell 10' reaches a predetermined threshold. The threshold design varies according to different design requirements. The threshold may depend on the material of one or a plurality of the positive electrode sheet, the negative electrode sheet, the electrolyte solution, and the separator in battery cell 10'. The pressure relief mechanism may take the form of an explosion-proof valve, a gas valve, a pressure relief valve, a safety valve, or the like, and may specifically adopt a pressure-sensitive or temperature-sensitive element or structure. That is, when the internal pressure or temperature of first battery cell 10 and/or second battery cell 20 reaches a predetermined threshold, first pressure relief mechanism 11 and/or second pressure relief mechanism 12 perform actions, or the weak structures arranged in first pressure relief mechanism 11 and/or second pressure relief mechanism 12 are damaged, thereby forming openings or passages through which internal pressure or temperature may be relieved.

The "actuate" mentioned in the present disclosure means that the pressure relief mechanism performs an action or is activated to a certain state, so that the internal pressure and temperature of battery cell 10' can be relieved. The action performed by first pressure relief mechanism 11 and/or second pressure relief mechanism 12 may include, but is not limited to, at least a part of first pressure relief mechanism 11 and/or second pressure relief mechanism 12 is ruptured, broken, torn, open, or the like. When first pressure relief mechanism 11 and/or second pressure relief mechanism 12 are actuated, high-temperature and high-pressure substances inside battery cell 10' will be discharged from the actuated part as emissions. In this way, the pressure and temperature of first battery cell 10 and/or second battery cell 20 can be relieved under a controllable pressure or temperature, so as to avoid more serious potential accidents.

The emissions mentioned in the present disclosure include, but are not limited to, the electrolyte solution, dissolved or split positive and negative electrode sheets, fragments of the separator, high-temperature and high-pressure gases produced by reactions, flames, and the like.

Regarding dimensional relationships between first weak portion 42 and first through hole 33 and between second weak portion 43 and second through hole 34, as shown in FIG. 4(b), preferably in first direction X, a projection of first weak portion 42 covers a projection of first through hole 33, and a projection of second weak portion 43 covers a projection of second through hole 34. Therefore, it can be further guaranteed that first weak portion 42 will not partially opened due to the impact of the emissions ejected from second pressure relief mechanism 12 of second battery cell 20, and second weak portion 43 will not partially opened due to the impact of the emissions ejected from first pressure relief mechanism 11 of first battery cell 10.

Here, the "weak portion" refers to a portion that is easily broken when subjected to an impact. For example, first weak portion 42 is arranged by forming a score in the first guard member 40 or by configuring the thickness of first weak portion 42 to be thinner than other parts of first guard member 40, and second weak portion 43 is arranged by forming a score in second guard member 41 or by configuring the thickness of second weak portion 43 to be thinner than other parts of second guard member 41. Therefore, the emissions ejected from first pressure relief mechanism 11 can impact first weak portion 42 from first through hole 33 and enter the space in partition component 30. The emissions ejected from second pressure relief mechanism 21 can impact second weak portion 43 from second through hole 34 and enter the space in partition component 30.

In addition, first through hole 33 and first weak portion 42 are both in a circular structure as shown in FIG. 4(b), but the present disclosure is not limited to this. First through hole 33 and first weak portion 42 may also be in a shape other than a circle, for example, in various shapes such as a rectangle, a square, a pentagon, and an ellipse. In FIG. 4(b), only the dimensional relationship between first through hole 33 and first weak portion 42 is shown, but the dimensional relationship between second through hole 34 and second weak portion 43 is also the same.

As shown in FIG. 3(a), FIG. 3(b), and FIG. 4(a), first guard member 40 is arranged to closely attach to first wall 31, and second guard member 41 is arranged to closely attach to second wall 32. By making a distance between first guard member 40 and first wall 31 small in first direction X, and making a distance between second guard member 41 and second wall 32 small in first direction X, closely attached first wall 31 can be used to support first guard member 40, and closely attached second wall 32 can be used to support second guard member 41. Therefore, for example, when the emissions entering partition component 30 from first through hole 33 impacts second guard member 41, second wall 32 can support second guard member 41, thus guaranteeing the structural rigidity of second guard member 41, so that the emissions entering from first through hole 33 will not break through second weak portion 43 and reach second battery cell 20. It is the same for first guard member 40, that is, when the emissions entering partition component 30 from second through hole 34 impacts first guard member 40, first wall 31 can support first guard member 40, thus guaranteeing the structural rigidity of first guard member 40, so that the emissions entering from second through hole 34 will not break through first weak portion 42 to reach first battery cell 10.

FIG. 3(b) and FIG. 4(a) show a structure in which partition component 30 has first wall 31, second wall 32, and connecting component 35, and connecting component 35 is configured to connect first wall 31 and second wall 32. Therefore, the rigidity of entire partition component 30 can be strengthened, and partition component 30 can be integrally formed, thereby improving the productivity.

Figure 5A:
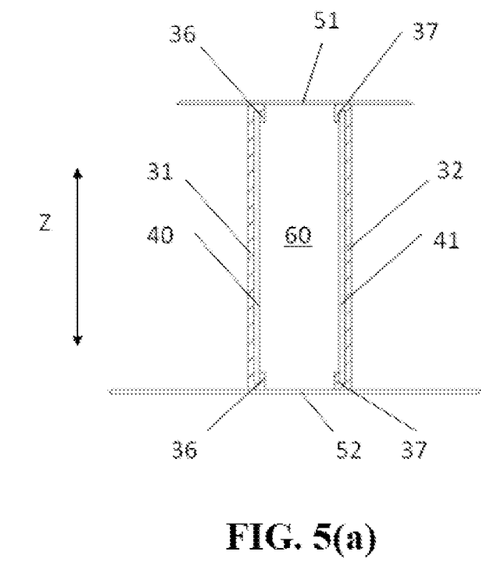
FIG. 5(a) is a schematic structural diagram of an exhaust passage when a partition component is composed of a first wall and a second wall.
Figure 5B:
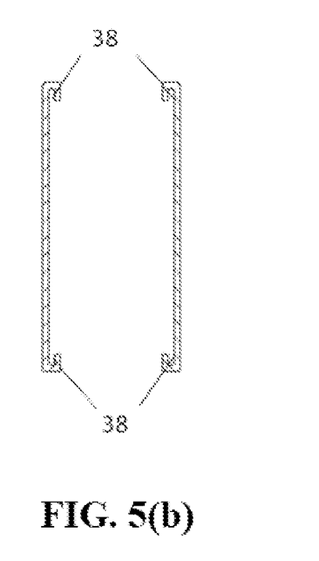
FIG. 5(b) is a schematic structural diagram of the partition component in FIG. 5(a)

However, the present disclosure is not limited to this, and partition component 30 may have only first wall 31 and second wall 32. As shown in FIG. 5(a), a schematic structural diagram of exhaust passage 60 when partition component 30 is constituted by first wall 31 and second wall 32 is shown, in which representations of the through holes and the weak portions are omitted. As shown in FIG. 5(b), a schematic structural diagram of partition component 30 in FIG. 5(a) is shown.

As shown in FIG. 5(a), box body 50 has upper cover 51 and box shell 52 that are connected in second direction Z, and first wall 31, second wall 32, upper cover 51, and box shell 52 surround together to form exhaust passage 60 for the emissions to flow. In order to make the emissions entering into the space in partition component 30 from first through hole 33 and second through hole 34 flow along exhaust passage 60 and no longer leak to the outside of partition component 30, partition component 30 is sealed with both upper cover 51 and box shell 52. The sealing may be achieved, for example, by applying a sealant, providing a seal liner, or the like (not shown). In addition, as shown in FIG. 2, exhaust member 70 is formed at a position of box body 50 opposite to an outlet of exhaust passage 60, and exhaust member 70 is configured to discharge the emissions flowing in exhaust passage 60 to the outside of box body 50. Therefore, the emissions that reach the outlet via exhaust passage 60 can be efficiently discharged to the outside of box body 50 to improve the overall safety of battery 1.

Furthermore, as shown in FIG. 5(a), partition component 30 further includes first support member 36 configured to support first guard member 40, and second support member 37 configured to support second guard member 41. First support member 36 is connected to first wall 31, and second support member 37 is connected to second wall 32. Therefore, first guard member 40 and second guard member 41 can be stably supported by first support member 36 and second support member 37 of partition component 30.

As shown in FIG. 5(b), in partition component 30, slot 38 for first guard member 40 to slide is formed between first wall 31 and first support member 36, for positioning first guard member 40, and slot 38 for second guard member 41 to slide is formed between second wall 32 and second support member 37, for positioning second guard member 41. Therefore, during installation, first guard member 40 and second guard member 41 can be slid along slots 38 to appropriate installation positions, thereby improving the positioning accuracy. Further, when partition component 30 is long in the extending direction, i.e., third direction Y, first guard member 40 and second guard member 41 can be well placed into suitable installation positions.

Figure 6:
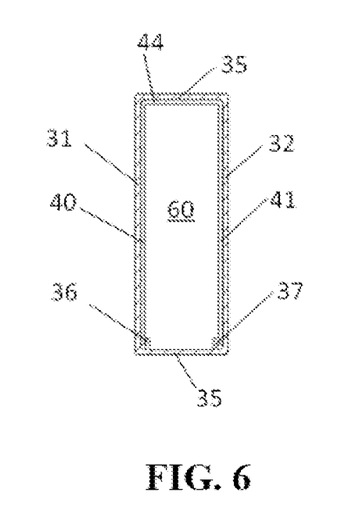
FIG. 6 is another example of the structure of the partition component.

As shown in FIG. 6, another example of the structure of partition component 30 is shown.

In the present disclosure, partition component 30 may include connecting component 35, and connecting component 35 is configured to connect first wall 31 and second wall 32. Connecting component 35 only needs to be able to connect first wall 31 and second wall 32 and avoid first through hole 33, second through hole 34, first guard member 40, and second guard member 41, and the arrangement position thereof in second direction Z is not particularly limited. For example, as shown in FIG. 6, connecting components 35 are formed at both the top and the bottom of partition component 30 in second direction Z. Connecting component 35 at the top is in seal connection with upper cover 51, and connecting component 35 at the bottom is in seal connection with box shell 52. That is, partition component 30 is formed in a square shape, and the area of the seal connection is increased compared with the partition component shown in FIG. 5(a) where connecting component 35 at the top and connecting component 35 at the bottom are not formed, which can not only enhance the rigidity of entire partition component 30, but also enhance the sealing performance.

Furthermore, as shown in FIG. 6, partition component 30 further includes first support member 36 configured to support first guard member 40, and second support member 37 configured to support second guard member 41. Both first support member 36 and second support member 37 are connected to connecting component 35 at the bottom. The arrangement positions of first support member 36 and second support member 37 are not limited thereto, first support member 36 may be connected to first wall 31 and/or connecting components 35, and second support member 37 may be connected to second wall 32 and/or connecting components 35.

As shown in FIG. 6, in order to improve the rigidity of first guard member 40 and second guard member 41, first guard member 40 and second guard member 41 may be connected via guard connector 44. In this case, first guard member 40, guard connector 44, and second guard member 41 may be integrally formed, thereby facilitating processing and improving the productivity.

Figure 7:
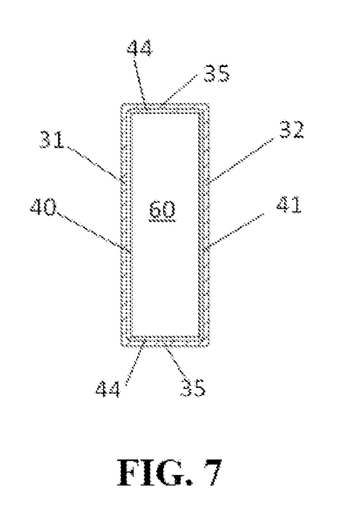
FIG. 7 is still another example of the structure of the partition component.

As shown in FIG. 7, still another example of the structure of partition component 30 is shown, and first support member 36 and second support member 37 are not formed in this example partition component 30 is formed in a square shape as a whole by forming connecting components 35 at the top and bottom, respectively. First guard member 40 and second guard member 41 are connected by guard connector 44 at the top and guard connector 44 at the bottom. In the case of adopting this structure, first guard member 40, second guard member 41, and guard connectors 44 can be fixed by bonding or the like to various inner surfaces of partition component 30, respectively.

An example of the present disclosure further provides a powered device, and the powered device may include battery 1 in any of the preceding examples. Battery 1 is configured to provide electrical energy in the powered device.

The battery and the powered device of the examples of the present disclosure are described above, and the method and device for preparing a battery of the examples of the present disclosure will be described below. For the parts not described in detail, reference may be made to the foregoing examples.

Figure 8:
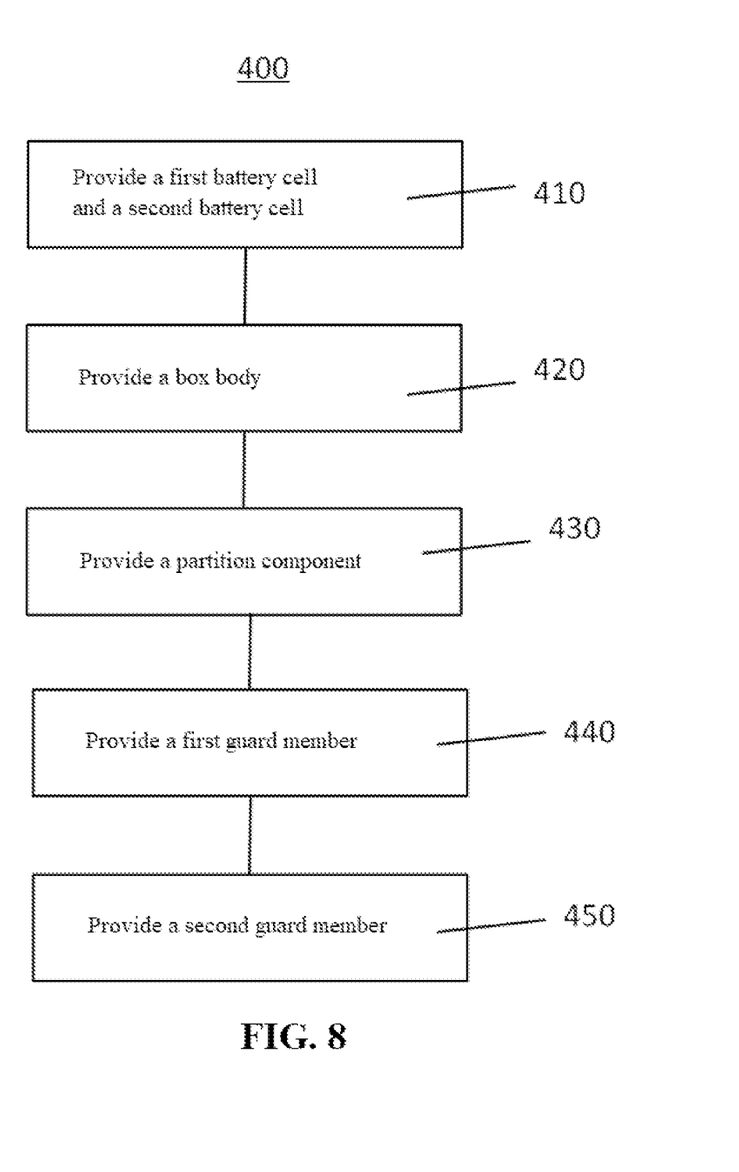
FIG. 8 is a schematic flowchart of a method for preparing a battery according to an example of the present disclosure.

FIG. 8 is a schematic flowchart of method 400 for preparing a battery according to an example of the present disclosure. As shown in FIG. 8, method 400 may include:

410: Providing first battery cell 10 and second battery cell 20, wherein a pressure relief mechanism of first battery cell 10 and a pressure relief mechanism of second battery cell 20 are arranged opposite to each other in first direction X;

420: Providing box body 50, wherein box body 50 accommodates first battery cell 10 and second battery cell 20;

430: Providing partition component 30, wherein partition component 30 is configured to partition first battery cell 10 and second battery cell 20 in first direction X, partition component 30 includes first wall 31 and second wall 32 arranged opposite to each other, first wall 31 is provided with first through hole 33, second wall 32 is provided with second through hole 34, first through hole 33 is configured to guide emissions discharged from the pressure relief mechanism of first battery cell 10, and second through hole 34 is configured to guide emissions discharged from the pressure relief mechanism of second battery cell 20;

440: Providing first guard member 40, wherein first guard member 40 is attached to first wall 31, and first guard member 40 has first weak portion 42 arranged opposite to first through hole 33; and 450: Providing second guard member 41, wherein second guard member 41 is attached to second wall 32, and second guard member 41 has second weak portion 43 arranged opposite to second through hole 34, wherein in a cross section perpendicular to first direction X, the area of first weak portion 42 is greater than that of first through hole 33, and the area of second weak portion 43 is greater than that of second through hole 34.

Figure 9:
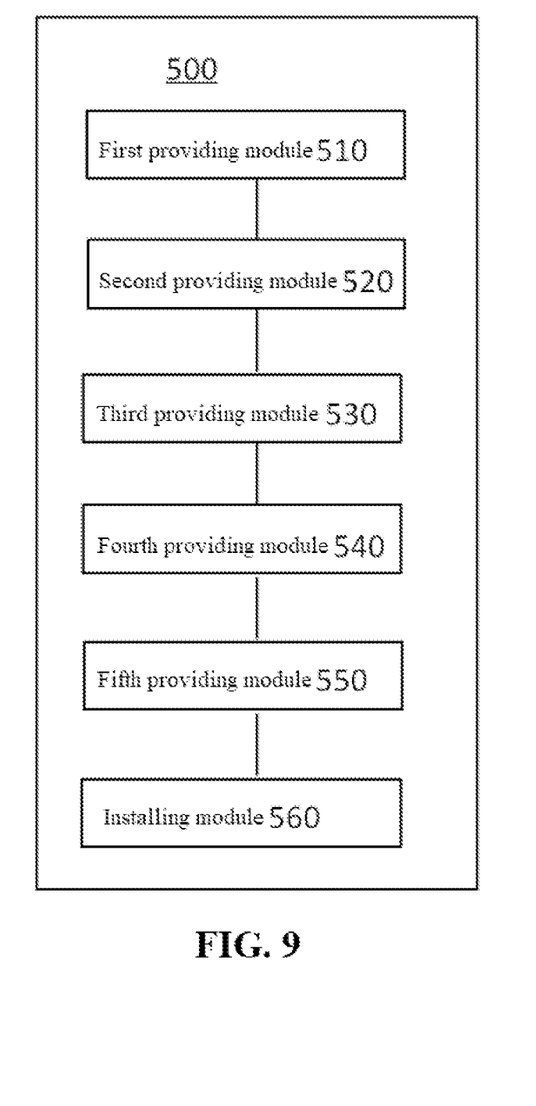
FIG. 9 is a schematic block diagram of a device for preparing a battery according to an example of the present disclosure.

FIG. 9 is a schematic block diagram of device 500 for preparing a battery according to an example of the present disclosure. As shown in FIG. 9, device 500 for preparing a battery may include:

first providing module 510 configured to provide first battery cell 10 and second battery cell 20, wherein a pressure relief mechanism of first battery cell 10 and a pressure relief mechanism of second battery cell 20 are arranged opposite to each other in first direction X;

second providing module 520 configured to provide box body 50, wherein box body 50 accommodates first battery cell 10 and second battery cell 20;

third providing module 530 configured to provide partition component 30, wherein partition component 30 is configured to partition first battery cell 10 and second battery cell 20 in first direction X, partition component 30 includes first wall 31 and second wall 32 arranged opposite to each other, first wall 31 is provided with first through hole 33, second wall 32 is provided with second through hole 34, first through hole 33 is configured to guide emissions discharged from the pressure relief mechanism of first battery cell 10, and second through hole 34 is configured to guide emissions discharged from the pressure relief mechanism of second battery cell 20;

fourth providing module 540 configured to provide first guard member 40, wherein first guard member 40 has first weak portion 42;

fifth providing module 550 configured to provide second guard member 41, wherein second guard member 41 has second weak portion 43; and installing module 560 configured to attach first guard member 40 to first wall 31 so that first weak portion 42 of first guard member 40 is arranged opposite to first through hole 33, attach second guard member 41 to second wall 32 so that second weak portion 43 of second guard member 41 is arranged opposite to second through hole 34, and install partition component 30 and battery cell 10 on box body 50, wherein in a cross section perpendicular to first direction X, the area of first weak portion 42 is greater than that of first through hole 33, and the area of second weak portion 43 is greater than that of second through hole 34.

Finally, it should be noted that the above examples are merely used for illustrating rather than limiting the technical solutions of the present disclosure. Although the present disclosure has been described in detail with reference to the above various examples, those of ordinary skill in the art should understood that the technical solutions specified in the above various examples can still be modified, or some of the technical features therein can be equivalently substituted. However, such modifications or substitutions do not make the essence of the corresponding technical solutions depart from the scope of the technical solutions of the various examples of the present disclosure.

The invention claimed is:

1. A battery, comprising:
   a first battery cell and a second battery cell, wherein a pressure relief mechanism of the first battery cell and a pressure relief mechanism of the second battery cell are arranged opposite to each other in a first direction;
   a box body accommodating the first battery cell and the second battery cell; and
   a partition component configured to partition the first battery cell and the second battery cell in the first direction, wherein
     the partition component includes a first wall and a second wall arranged opposite to each other, wherein the first wall is provided with a first through hole, the second wall is provided with a second through hole, the first through hole being configured to guide emissions discharged from the pressure relief mechanism of the first battery cell, and the second through hole being configured to guide emissions discharged from the pressure relief mechanism of the second battery cell,
     a first guard member is attached to the first wall, the first guard member having a first weak portion arranged opposite to the first through hole,
     a second guard member is attached to the second wall, the second guard member having a second weak portion arranged opposite to the second through hole; and,
   wherein in a cross section perpendicular to the first direction, the area of the first weak portion is greater than that of the first through hole, and the area of the second weak portion is greater than that of the second through hole.

2. The battery according to claim 1, wherein
the first guard member is attached to the first wall, and the second guard member is attached to the second wall.

3. The battery according to claim 1, wherein
the first weak portion is arranged by forming a score in the first guard member or by configuring the thickness of the first weak portion to be thinner than other portions of the first guard member, and
the second weak portion is arranged by forming a score in the second guard member or by configuring the thickness of the second weak portion to be thinner than other portions of the second guard member.

4. The battery according to claim 1, wherein
in the first direction, a projection of the first weak portion covers a projection of the first through hole, and a projection of the second weak portion covers a projection of the second through hole.

5. The battery according to claim 1, wherein
the box body has an upper cover and a box shell that are connected in a second direction, the first battery cell and the first battery cell are accommodated in a space surrounded by the upper cover and the box shell, the second direction is orthogonal to the first direction,
and the partition component is hermetically connected to the upper cover and the box shell.

6. The battery according to claim 5, wherein
the first wall, the second wall, the upper cover, and the box shell surround together to form an exhaust passage for the emissions to flow.

7. The battery according to claim 6, wherein
an exhaust member is formed at a position of the box body opposite to an outlet of the exhaust passage, wherein the exhaust member is configured to discharge the emissions flowing in the exhaust passage to the outside of the box body.

8. The battery according to claim 1, wherein
the partition component further comprises a connecting component, and the connecting component is configured to connect the first wall and the second wall.

9. The battery according to claim 8, wherein
the box body has an upper cover and a box shell connected in a second direction, the second direction is orthogonal to the first direction,
both the top and the bottom of the partition component in the second direction are formed with the connecting components, wherein the connecting component at the top is in seal connection with the upper cover, and the connecting component at the bottom is in seal connection with the box shell.

10. The battery according to claim 1, wherein
the partition component further comprises a first support member configured to support the first guard member, and a second support member configured to support the second guard member.

11. The battery according to claim 10, wherein
the first support member is connected to the first wall, and the second support member is connected to the second wall.

12. The battery according to claim 8, wherein
the partition component further comprises a first support member configured to support the first guard member, and a second support member configured to support the second guard member.

13. The battery according to claim 12, wherein
the first support member is connected to the first wall and/or the connecting components, and
the second support member is connected to the first second wall and/or the connecting components.

14. The battery according to claim 13, wherein
a slot for the first guard member to slide is formed between the first wall and the first support member, for positioning the first guard member, and
a slot for the second guard member to slide is formed between the second wall and the second support member, for positioning the second guard member.

15. The battery according to claim 1, wherein
the first guard member and the second guard member are connected via a guard connector.

16. The battery according to claim 15, wherein
the first guard member, the guard connector, and the second guard member are integrally formed.

17. A powered device, comprising the battery according to claim 1, wherein
the battery is configured to provide electrical energy.

18. A method for preparing a battery, comprising:
providing a first battery cell and a second battery cell, wherein a pressure relief mechanism of the first battery cell and a pressure relief mechanism of the second battery cell are arranged opposite to each other in a first direction;
providing a box body, wherein the box body accommodates the first battery cell and the second battery cell;
providing a partition component, wherein the partition component is configured to partition the first battery cell and the second battery cell in the first direction, wherein the partition component comprises a first wall and a second wall arranged opposite to each other, the first wall is provided with a first through hole, the second wall is provided with a second through hole, the first through hole being configured to guide emissions discharged from the pressure relief mechanism of the first battery cell, and the second through hole being configured to guide emissions discharged from the pressure relief mechanism of the second battery cell;
providing a first guard member, wherein the first guard member is attached to the first wall, and the first guard member has a first weak portion arranged opposite to the first through hole; and
providing a second guard member, wherein the second guard member is attached to the second wall, and the second guard member has a second weak portion arranged opposite to the second through hole,
wherein in a cross section perpendicular to the first direction, the area of the first weak portion is greater than that of the first through hole, and the area of the second weak portion is greater than that of the second through hole.

19. A device for preparing a battery, comprising:
a first providing module configured to provide a first battery cell and a second battery cell, wherein a pressure relief mechanism of the first battery cell and a pressure relief mechanism of the second battery cell are arranged opposite to each other in a first direction;
a second providing module configured to provide a box body, wherein the box body accommodates the first battery cell and the second battery cell;
a third providing module configured to provide a partition component, wherein the partition component is configured to partition the first battery cell and the second battery cell in the first direction, the partition component includes a first wall and a second wall arranged opposite to each other, the first wall is provided with a first through hole, the second wall is provided with a second through hole, the first through hole is configured to guide emissions discharged from the pressure relief mechanism of the first battery cell, and the second through hole is configured to guide emissions discharged from the pressure relief mechanism of the second battery cell;
a fourth providing module configured to provide a first guard member, wherein the first guard member has a first weak portion;
a fifth providing module configured to provide a second guard member, wherein the second guard member has a second weak portion; and
an installing module configured to attach the first guard member to the first wall so that the first weak portion of the first guard member is arranged opposite to the first through hole, attach the second guard member to the second wall so that the second weak portion of the second guard member is arranged opposite to the second through hole, and install the partition component and the battery cells on the box body,
wherein in a cross section perpendicular to the first direction, the area of the first weak portion is greater than that of the first through hole, and the area of the second weak portion is greater than that of the second through hole.

* * * * *